United States Patent Office 3,199,591
Patented Aug. 10, 1965

3,199,591
SUBTERRANEAN FORMATION FRACTURING
METHOD AND COMPOSITION
James A. Kepley, Oklahoma City, Okla., assignor to Continental Oil Company, Ponca City, Okla., a corporation of Delaware
No Drawing. Filed Dec. 7, 1962, Ser. No. 242,923
12 Claims. (Cl. 166—42)

The present invention relates to new methods for treating subterranean formations and to new compositions for use in such operations. More particularly, the invention concerns the forcing into subterranean formations certain improved fluids which eliminate or mitigate corrosion, souring and/or plugging problems which have been experienced in the past in treatment of wells.

It is a standard practice in certain industries to subject fluid-bearing subterranean formations to procedures known as "squeezing" or "fracturing" in order to increase the production of fluids from such formations. As is well known to those skilled in the art, the term "squeezing" refers to an operation whereby fluids which may or may not contain certain additives are forced under pressure into the formation. The pressures involved are not, however, of such magnitude as to fracture any portion of the rock, or, as it is sometimes referred to, lift the overburden. The operation known as fracturing is similar in many ways to the squeeze. This latter type operation involves pumping down a bore hole which penetrates a formation a special fluid composition which is referred to in the industry as fracturing fluid. The hydraulic pressure upon the fluid forces it to penetrate the formation and to create lateral flow channels that communicate with the bore hole.

Fluids injected into subterranean formations during squeezing or fracturing comprise as one major component a carrier liquid which is commonly water, but which in other instances may be other pressure-stable liquid such as brine, gasoline, kerosene or other relatively low cost and available liquid. Often a gelling agent is added to the carrier liquid, e.g., gums or starch for water and aluminum soaps for gasoline, to increase viscosity as an aid in retaining the liquid within the formation during the injection operation.

The term "injected fluid" as used in the following description and the accompanying claims is defined to comprise a composition or mixture designed primarily for use either in fracturing or squeezing of subterranean fluid-bearing formations which contains as an essential component a "carrier liquid," which is defined to comprise a substantially pressure-stable liquid such as water, gasoline or the like which may be forced into a subterranean formation.

The injected fluids employed for fracturing subterranean formations often include, in addition, a substantial proportion of finely-subdivided insoluble solid material which is suspended in the carrier liquid. These suspended solid particles flow with the carrier liquid into the lateral channels created in the formation by the fluid and accumulate in the channels to serve as props to retain the flow channels open after the pressure is released from the fluid. Many such materials are well known in the art and are commonly referred to in the trade as "propping agents." Where used in the following description and accompanying claims the term "propping agent" is defined to comprise a solid, the major portion of which is sufficiently finely-subdivided to pass a No. 5 U.S. series standard screen, and is sufficiently large to be retained upon a No. 140 standard sieve of the U.S. series, and which is substantially insoluble in the carrier liquid of the injected fluid and has a hardness of at least about 3 on the Mohs scale of hardness. Siliceous sand is the material most commonly employed as a propping agent in fracturing fluids, although other materials such as aluminum pellets, walnut hull particles, and glass have been used with varying degrees of success.

In order to function properly, the injected fluid must penetrate the subterranean formation to a point several feet away from the bore hole. Since subterranean formations are normally porous, a problem is sometimes presented by the tendency of the injected fluid, particularly if it has good penetrating properties for the formation in question, to be lost in the formation or to flow at an undesirably rapid rate outwardly into the formation. This phenomena is referred to in the oil industry as "fluid loss" and in order to mitigate this loss, additives for the fluid have been developed which reduce or eliminate the fluid loss tendency of the fracturing fluid. U.S. Patents 2,779,735 and 3,046,222 describe various materials which are useful for this purpose, particularly with fracturing fluid using hydrocarbons as the carrier liquid. When water is used as the carrier liquid, starches and gums as well as compositions containing finely-divided solid materials or plugging materials may be employed to mitigate fluid loss. The term "fluid loss agent" as used in the following discussion and the accompanying claims is defined to comprise material which includes finely divided, substantially oil-insoluble and water-insoluble solid material which, when added to an injected fluid, substantially reduces the loss of such fluid into the formation.

The injection of fluids during squeeze or fracture treatment of wells creates some baffling problems. For example, at numerous wells in a variety of locations there has occurred severe corrosion of metal parts and equipment after the wells had been treated by water fracture. In such cases, the wells had operated before fracturing with a normally expected degree of corrosion and scaling, but after the well was treated by water fracturing, an abnormal increase in corrosion problems was encountered. In other cases, a well after water fracture operated as expected for a relative brief period, but then its output fell off unduly apparently because of plugging of flow channels or fluid conduits involved with the production from the well. In still other cases, the treatment of wells by fluid injection has produced "souring" of wells which, before treatment, had operated as sweet wells. These and other related problems resulting from treatment of wells have constituted a baffling problem to well service organizations who have been in need of some means by which these problems could be eliminated or mitigated so that treatment of wells could be accomplished without simultaneous creation of corrosion, plugging and souring problems.

A principal object of this invention is the provision of new and improved methods for treating fluid-bearing subterranean formations. Further objects include the provision of:

(1) New methods for overcoming corrosion problems encountered in wells following treatment by fluid injection.

(2) New compositions for use in well treating, particularly for aqueous squeeze and fracture.

(3) New additives for fluids to be used in the treatments of subterranean formations in order to create lateral flow channels in the formation.

(4) New techniques of water injection into subterranean formations to reduce or eliminate souring or clogging of the well following the water injection.

(5) New combinations of materials for use in fluids for injection into subterranean formations which will not only initially protect wells against corrosion and other problems encountered in wells following water injection, but will also enable such protection against these hazards to be extended over a substantial period of time.

(6) New improvements in formation treating operations which can be employed at relatively low cost, making it commercially feasible to utilize the new improvements as a form of insurance against corrosion, plugging and souring difficulties which might otherwise occur as a result of application of water injection into a well.

(7) Improved well fracturing procedures and fracturing compositions which are compatible with other established well operations and subsequent use of the fluids produced by the so-treated wells, e.g., which do not render the produced crude oil poisonous to catalysts which are used in the refining of the crude oil.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

These objects are accomplished according to the present invention by the provision of methods for producing fluids from fluid-bearing subterranean formations without pronounced corrosion to metal elements in contact with fluids which issue from the formation and without substantial plugging of fluid conduits that convey said fluids. In broad expression, these methods comprise (a) forcing into a formation an injection fluid containing between about 100 to about 100,000 parts of a bactericide toxic to micro-organisms per million parts of injected material and (b) removing at least a portion of the injection fluid from the formation prior to production of connate fluid from the formation.

In broad expression, the present invention may be practiced utilizing a wide spectrum of various types of biocides or biostats, which will be hereinafter referred to collectively by the term "bactericide." Generally, the type of bactericide which is chosen will not be particularly critical to the basic result desired. However, as will be pointed out hereinafter, certain types of bactericides produce substantial improvements over the results which are produced by other types. At this juncture, it is sufficient to indicate that a bactericide must be characterized by two features before it will be considered appropriate for use with this invention. Furthermore, all bactericides which are characterized by these two features are considered appropriate. Generally, it may be said that bactericides for use with the present invention must have adequate bactericidal or bacteristatic properties to produce at least an 85%, and preferably at least a 90% kill or complete inhibition of growth of the undesired organisms when used in the carrier liquid at the recommended concentrations. A second necessary characteristic which is implied in the first is the requirement that the bactericide must be at least partially soluble or dispersable in the carrier fluid and must evince a solubility of at least about one part per million in the return fluid from the well at formation conditions.

To obtain maximum benefit from the practice of a preferred embodiment of the invention, there is a third feature which must characterize the bactericide used, namely, the bactericide must be adsorbed on the formation and well hardware. The degree of adsorption is not considered to be critical and any amount thereof is considered advantageous so long as formation plugging due to excessive adsorption does not occur.

In a preferred embodiment, the bactericide which is employed as defined above is a water-soluble, organic substituted, quaternary ammonium compound characterized by its ability to reduce the surface tension of water when added thereto in said amounts and especially in an amount between about 200 to 3000 parts per million parts of carrier fluid.

In the following discussion, some emphasis will be given to the utilization of this invention in a fracturing operation. It is to be understood, however, that the invention is also applicable to squeeze techniques.

Advantageously, the injection fluid employed in the methods as specified during a fracturing operation comprises a propping agent which is generally employed in a weight ratio with respect to the carrier liquid between about 1:100 and about 5:1, the proportions of the propping agent and carrier liquid being such as to provide a pumpable mixture.

Advantageously also, there is incorporated in the injected fluid a fluid loss agent in an amount effective to control fluid loss in the well under treatment under the conditions of hydraulic pressure, well depth, formation porosity and other factors bearing upon the amount of treating fluid loss to be tolerated in the injection operation. Generally, the amount of fluid loss agent used will be from about 0.1 to about 25 percent by weight of the total injected material, with a preferred range of from about 0.25 to about 3 weight percent. It is stressed, however, that these ranges are not critical and either more or less fluid loss agent may be used if desired. While there are a variety of different types of fluid loss additives on the market, some of which form gels, a common type of fluid loss additive comprises particulated material. As will be discussed hereinafter, a large number of different types of material are used for this purpose including various silicious materials, certain naturally occurring vegetable matter, and the like. When particulate materials are utilized for this purpose, they are comminuted or otherwise formed to the standard particle size range which is from about 0.01 to about 50 microns.

In one modification, a bactericide toxic to sulfate reducing bacteria, such as Desulfavibrio, which is employed in accordance with the invention, is a partially water-soluble solid, preferably having a particle size between about .01 to 2000 microns, which is suspended in the injected fluid. Within this range particles of from about 0.01 to about 50 microns are of special utility since this latter range is the same range commonly utilized for particulated fluid loss additives. Consequently, inasmuch as the solid character of the bactericide is maintained for a substantial length of time due to its only partial solubility in water, the bactericide itself functions as a fluid loss additive.

In order to function satisfactorily in this dual role, it is necessary that the bactericide be not quickly dissolved in the fluids in the well bore or formation. Once the squeeze or fracture operation has been completed, of course, then the presence of the fluid loss additive is no longer critical and the loss of the particulate character of the bactericide does not adversely affect the fluid loss characteristics of the operation. Normally, solubilities of from about 100 to about 500 parts per million in the carrier fluid at reservoir conditions are suitable for the present purpose. Within this range a preferred range is from about 100 to about 200 parts per million. Examples of materials which are satisfactory for this dual role are Di (hydrogenated tallow) dimethyl ammonium chloride and N-Tallow 1,3-propylene diamine.

As a second modification, the bactericide is incorporated into solid particles which are then utilized as the propping agent as hereinbefore defined. The solid particles are themselves of a size within the ranges set forth for propping agents and are, of necessity, characterized by being substantially inert in the fluids in the well bore and formation. In addition, the particles utilized for this purpose are characterized by sufficient structural integrity to withstand the compressive stresses to which propping agents are subjected. In general there are at least two methods by which the bactericide can be incorporated with the propping agent. In practicing one such method, a substantially non-porous propping agent is utilized with the bactericide in more or less solid form adsorbed on the surface of the agent. In a second embodiment, a porous material is utilized for the propping agent, with the bactericide, which is preferably solid or semi-solid, impregnated into the pores of the elemental particles.

While there are a number of materials which serve satisfactorily for the matrix for use in the second type of propping agent, particularly suitable substances are fritted materials, such as aluminum, or ceramic; or the porous concrete which is described in United States patent application No. 130,473, filed August 10, 1961, entitled "Method and Composition for Well Completion"; or diatomaceous earth. In any event, in a preferred embodiment the bactericide which is used with the propping agent has limited solubility in the carrier fluid, i.e., a solubility in water or crude oil which is the same as that encountered when a solid bactericide is used alone as discussed above.

In coating the rigid particles with bactericide, a number of methods can be utilized. One of the more satisfactory methods comprises the slurrying of the particulated material in a solvent solution of the desired bactericide. The solvent is then withdrawn by vacuum while agitating the slurry. Examples of materials which are suitable for use with a propping agent are N-Tallow, 1,3-propylene diamine and Di (hydrogenated tallow) dimethyl ammonium chloride.

In preparing the bactericide with the porous propping agent, one method which is satisfactory includes the steps of forming a filter bed with the untreated particles followed by passing a solution containing bactericide through the filter bed accompanied by agitation thereof and finally removal of excess solvent by vacuum drying. Suitable solvents include hexane, isopropanol, chloroform and the like, while bactericides suitable for this purpose include the same materials suitable for coating the exterior of the propping agent together with other materials such as stearyl trimethyl ammonium chloride and secondary coconut oil amine.

The new injection compositions for use in accordance with this invention comprise (a) a carrier liquid and (b) a bactericide effective against microorganisms, which, in a preferred embodiment, include sulfate reducing bacteria. In addition, when these compositions are to be used in a fracturing operation, a propping agent is usually suspended in the carrier liquid, the weight ratio of the agent to the liquid ordinarily being between about 1:100 and about 5:1, although values outside the range may be chosen so long as there is provided a pumpable mixture. The bactericide is present in the composition in an amount between about 100 and about 100,000 parts per million parts of the carrier liquid.

Preferred compositions for use in accordance with the invention comprise (a) water, and (b) as a bactericide effective against sulfate reducing bacteria, an organic substituted quarternary ammonium compound in an amount between about 100 to about 100,000 parts by weight per million parts of water and, preferably, between about 300 to about 5000 parts per million parts of water. In a preferred embodiment, the compositions contain a fluid loss agent as hereinbefore defined.

The success of the present invention is due largely to two related discoveries. First, was the recognition that many of the corrosion, plugging and souring problems encountered after water fracturing of wells involved sulfate reducing bacteria and that the conditions created by the water fracturing sometimes create a high activity of such bacteria within the well and the communicating formations. Of course, it has been well known for many years that sulfate reducing bacteria may be present in wells and that the growth of such microorganisms under conditions which may arise in the wells can create serious problems. Accordingly, it has become a rather common practice in certain types of procedures to employ materials for controlling sulfate reducing bacteria, e.g., see U.S. 2,912,378; 2,947,691; 3,001,936 and numerous other similar patent specifications. However, no one heretofore has recognized the relationship of sulfate reducing bacteria to the corrosion, plugging and souring problems encountered in wells following water fracture.

A second discovery which has contributed to the success of the present invention concerns the combining with injected fluid of certain materials which not only serve to control the growth of the sulfate reducing bacteria within the well system but also function to protect the metal elements involved in the well system against corrosive effects of such bacteria. This latter feature is vividly illustrated by the fact that it has been found that following water fracture with fracturing fluid which includes a bactericide as hereinbefore defined, the amount of hydrogen sulfide in the produced fluids may initially decrease, but may shortly rise again to a substantial level. However, even though the hydrogen sulfide remains at this level, no substantial corrosion problem reappears. This unexpected result may be explained on the basis that the bactericide, particularly the preferred quaternary ammonium compounds, concentrates after introduction into the well upon the surface of the metal elements forming a thin film which protects the metal from the ravages of the sulfate reducing bacteria and the hydrogen sulfide which they create. Thus, it can be seen that in a water fractured well, not only does the bactericidal quaternary ammonium compound kill or inhibit most or all of the troublesome bacteria, but also tends to coat the metal components of the well and protect the metal against the corrosive effects resulting from the bacteria.

In using quaternary ammonium compounds as the bactericide in accordance with the invention, an additional advantage has been observed which is particularly important from the viewpoint of the economical treatment of wells. Thus, these preferred compounds are adsorbed on the fluid containing formation so they are not immediately flushed out of the formation when the well is placed back on production. Instead, they are slowly released into the subterranean fluids and become available to counteract undesired bacteria and for the chemical passivation of the metal elements in the well system. A still further advantage to the use of quaternary ammonium compounds in accordance with the invention is that they act as de-emulsifiers to mitigate the formation of troublesome emulsions which can occur as a result of or in connection with water fracture.

Advantageous results may be obtained from the practice of the present invention under a variety of conditions. Under one set of circumstances it will be found necessary to water fracture formations which are producing sweet crudes, i.e., crudes containing no substantial amount of hydrogen sulfide. Here, a bactericide is included in the fracture water as taught by this invention to preclude any souring of the well and to preclude any contamination of the well hardware which would otherwise result from hydrogen sulfide formed as souring occurs after ordinary water fracture.

In other circumstances, the formation to be treated will already be contaminated by bacteria either due to natural contamination or due to prior untreated water injections. Because of the relatively high concentration of hydrogen sulfide in the formation which can naturally be expected under these circumstances, the cessation of bacterial activity will not necessarily preclude further production of sour crude or of hydrogen sulfide. This, however, does not unduly limit the effectiveness of the present invention. More particularly, either a squeeze or fracture technique may be utilized using a bactericide as taught herein to preclude further bacterial activity in the formation or in the well bore with the possible increases in sulfide concentration which would attend such further activity. Additionally, when bactericides which are adsorbed are used, such as the organic substituted quaternary ammonium compounds and amines, the corrosive effect of the hydrogen sulfide already in the formation may, to a large extent, be overcome. This, of course, is effected by the mono-molecular film which is formed on the surface of the well hardware by these bactericides.

It may also be noted that when a formation has been contaminated by sulfate reducing bacteria for a relatively short time, a treatment either by squeeze or by fracture utilizing a bactericide, as taught by this invention, results in the sweetening of the well which has gone sour. Such sweetening, of course, occurs when substantially all residual hydrogen sulfide within the formation is removed by production after treatment.

Additionally, the present invention has unique advantages when utilized in fracturing gas producing wells. More particularly, when the disclosed quaternary ammonium compounds are used in concentrations above about 2000 parts per million to fracture gas wells, a substantial amount of foam is produced in the well bore upon return of these materials to the well bore from the formation. The presence of this foam prevents the formation of hydrostatic pressures within the bore which might otherwise block off the flow of gas thereinto. While the quaternary ammonium compounds have been mentioned specifically for this purpose, the primary and secondary amines listed hereinafter also produce satisfactory results. Generally, a preferred range of concentrations for this purpose is from about 2000 to about 5000 parts per million parts of carrier fluid.

EXAMPLES

A more complete understanding of the new methods and compositions of this invention may be had by reference to the following specific examples of actual operations in accordance with the invention. In these examples and throughout the remaining description and claims, all parts and percentages are by weight unless otherwise specified.

*Example I*

A number of wells located in the Mississippi Chat formation in the El Dorado, Kansas, area had been subjected to water fracture using locally available water. It was found that after the water fracture, the wells required remedial treatment for corrosion, scaling and plugging at much greater frequency than primary producing wells in the area. Further, it was found that the wells that had been water fractured began to produce hydrogen sulfide in noticeable quantities in about one to two months after the water fracture.

A primary producing well in the area which had been operating for about ten years was temporarily shut-in because it was making only about one barrel of oil per day with a trace of water. In order to increase its production level, it was subjected to water fracture using the following procedure.

A water holding pit was bull-dozed beside the well head and 2900 barrels of local creek water were hauled to the well and poured into the pit. The water which contained silt, clay and other foreign matter was pumped to a blender where sand, a gelling agent and a fluid loss agent were mixed with the water along with a mixture of alkyl substituted benzyl trimethyl ammonium chlorides. The sand which served as the propping agent was used in three sizes, i.e., 46,000 lbs. of 20–40 sand, 20,000 lbs. of 10–20 sand and 4,000 lbs. of 8–12 sand. Partially hydrolyzed starch was employed as a gelling agent and 500 lbs. were used. Five hundred pounds of fluid loss agent consisting of 200–235 mesh silica flour were also used.

The alkyl portion of the alkyl benzyl trimethyl ammonium chloride used in this example included alkyl chains of different lengths. Analysis indicates an alkyl distribution in this material as follows:

| Number of carbon atoms in alkyl: | Percent of total |
|---|---|
| 8 | 0.8 |
| 9 | 1.6 |
| 10 | 2.3 |
| 11 | 25.4 |
| 12 | 55.1 |
| 13 | 10.5 |
| 14 | 2.7 |
| 15 | 1.1 |
| 16 | 0.5 |

A total of 420 lbs. of the quaternary ammonium compound were used. One-half of this was added to the first one thousand barrels of water and the remaining 210 lbs. were added to the last 1900 barrels. Its addition and mixing was metered by measuring the liquid level drop in an open head 55 gallon drum fitted with a one inch valve through which the quaternary ammonium compound drained into the blender. A small amount of foaming occurred in the blender as a result of the admixture of the quaternary ammonium compound, but the foaming was not extensive and did not present any problem.

The resulting fracturing fluid comprising the quaternary ammonium compound as a bactericide was pumped into the well at an average injection rate of 37 barrels per minute under an average treating pressure of 1100 p.s.i. into the oil-bearing subterranean formation of the well to create lateral flow channels in the formation communicating with the bore hole. This was preceded by 500 gallons of 20% hydrochloric acid which was allowed to set for 20 minutes followed by 250 barrels of water containing 50 lbs. of the gelling agent and 50 lbs. of the fluid loss agent.

Following this fracture operation, the well was again put into production, and observed to produce between 15 and 17 barrels of oil per day. It was found that the first 1000 gallons of water which were swabbed back from the well contained about 12 p.p.m. of the quaternary ammonium compound, indicating that it was being gradually fed from the formation into the water flowing therefrom. This gradual feeding of active bactericide into the well fluids extended over a period of several months and, as this is written, has not ceased.

Simultaneously, the sulfate content of the produced water continued to rise and initially no hydrogen sulfide could be detected in the produced water. Later some hydrogen sulfide was detected and in view of the increase in sulfate it is believed that the hydrogen sulfide is from residual contamination of the formation.

Bacteria counts run on the well water at various times showed that there were no sulfate reducing bacteria in this fluid on the day following fracturing. This gradually increased to a count of 100–1000 per ml. at about one month following the fracturing and returned to zero at the end of about two months after fracture. Significantly, however, the increase in bacteria count was not accompanied by a detectable increase in hydrogen sulfide production. The reason for this temporary appearance of bacteria is not known precisely. It is hypothesized that the surface active nature of the bactericide tended to remove contaminated solids from the well hardware during the first few weeks after fracture. This would explain the eventual disappearance of the bacteria in produced fluids.

As a result of this operation, corrosion problems were substantially obviated.

An offset well was subjected to water fracture using a fracturing fluid similar to that described above except that it did not contain the quaternary ammonium compound. This offset well began to produce hydrogen sulfide in substantial amounts during the period when no detectable amount of hydrogen sulfide production was encountered with the well fractured with fluid which contained a quaternary ammonium compound and was found to have considerable corrosion problems.

The results obtained as noted above may be explained on the basis that the quaternary ammonium compound functions not only as a bactericide, but also is strongly adsorbed in the oil-bearing formation as well as the lines, tubing and casing of the well. The bactericide is then desorbed from the formation at a rather slow rate to maintain an effective level of bactericide in the water produced from the formation when the well is again put into production. At the same time, the quaternary ammonium compound adsorbed on the metal elements of the well protects them from the ravages of the corrosive materials present in the well fluids.

During the water fracture operation, the concentration of the quaternary ammonium compound averaged approximately 420 p.p.m. over the entire fracturing operation with a higher concentration of about 1000 p.p.m. being employed in the first thousand barrels of water.

In another case, an attempt was made to control corrosion in a well in the Mississippi Chat formation area mentioned above, following a standard, unimproved water fracture job by introduction into the annular space of the well a commercially available corrosion inhibitor which had no substantial toxic properties toward sulfate reducing bacteria. This was unsuccessful in controlling the increased corrosion caused in the well by the water fracture.

Example II

In the Burbank field of north central Oklahoma, crude oil of about 35 API gravity is produced from the Burbank sand and Mississippi Chat formation lying at an average depth of about 2500 feet. At the present stage of development of this field, primary production has been completed in a substantial area and a secondary waterflood has been undertaken. In the course of this waterflood, considerable contamination with sulfate reducing bacteria has been encountered and, consequently, severe corrosion problems have been observed in many of the recovery wells in the field.

In the process of stimulating the Burbank field, a water fracture operation was carried out in several of the wells located ahead of the waterflood front, with the same water which is being utilized in the waterflood. As such, the water contained about 15 parts per million of a 1:1 mixture of tallow trimethyl ammonium chloride and di-coco dimethyl ammonium chloride which is a bactericide similar to the quaternary ammonium chloride utilized in the El Dorado, Kansas, area.

It was found that no substantial decrease in bacterial activity resulted from this operation. Moreover, corrosion is, and continues to be, a serious problem in the Burbank secondary recovery project.

From this it may be seen that concentrations of bactericide which have been found to be suitable in waterflood activities are entirely unsuitable for the purposes taught by this invention.

Example III

The preceding examples cogently indicate that substantial unexpected advantages may be obtained from the practice of the present invention in field operations. In addition to the improvement in corrosion control and bacteria control which are obtained, there are concurrent advantages to formation permeability and filter cake characteristics. Bactericides which produce these additional advantages are characterized by being surface active and include the quaternary ammonium compounds and the amines. The following laboratory data shows the type of the improved flow characteristics obtained from these bactericides.

In preparing the following data, cylindrical, two-inch cores were cut into ¼-inch wafers which were then extracted with toluene, dried and saturated with water. The original permeability of each of the core wafers was established by mounting the wafers in a filter press and passing water through them at about 18 to 20 p.s.i. Two types of cores were used. In Table I there is presented data developed while using wafers made from the Tensleep sand formation while the remaining data were obtained using wafers of Berea sand.

After the permeability of each of the core wafers was determined, a group of four wafers taken from the Tensleep sand were selected and fluid loss tests were run in each at 1000 p.s.i. and 125° F. for thirty minutes. The fluid used in conducting the fluid loss tests consisted of distilled water having therein 0.05 lb. per gallon of a fluid loss additive consisting of conventional clay minerals with soluble gelling agents. The particle sizes of the clay portion of the fluid loss additive was between 0.01 to about 50 microns. After the fluid loss tests were run on each of the four wafers, the remaining fluid in the filter press was replaced wtih water which was injected into core number 1 at about 1000 p.s.i. in the direction of the fluid loss test. Subsequently, the water was replaced serially with water containing 10, 100 and 1000 parts per million of the quaternary ammonium compound used in Example I. The permeability in the direction of the original fluid loss test of a wafer was determined for each of the different concentrations of the bactericide using a pressure of about 1000 p.s.i. That is to say, the 10 p.p.m. solution was used in core number 2, the 100 p.p.m. solution in core number 3, etc. After the permeabilities were determined in the direction of the fluid loss test, the wafers were reversed and the permeabilities determined using a pressure of about 20 p.s.i. in a direction opposite to the fluid loss test. In this latter determination, the same concentrations of bactericide which were used previously were repeated in the same core wafers. The data obtained from this portion of the laboratory are summarized in Table I.

TABLE I

[Effect of quaternary ammonium bactericide on the permeability of Tensleep core wafers when flushed through the wafer after a fluid loss test using 0.05 lb./gal. clay type fluid loss additive]

| Core No. | 1 | 2 | 3 | 4 |
|---|---|---|---|---|
| Bactericide conc., p.p.m. | 0 | 10 | 100 | 1,000 |
| Spurt, ml. | 3.1 | 6.9 | 13.0 | 29.8 |
| Slope, ml. min.$^{-1/2}$ | 1.03 | 1.20 | 1.40 | 1.23 |
| Original permeability, md. | 89.6 | 179 | 115 | 196 |
| Retained permeability, direction of fluid loss test, md. | $5.0 \times 10^{-4}$ | $5.6 \times 10^{-4}$ | $11.0 \times 10^{-4}$ | $12.6 \times 10^{-4}$ |
| Retained permeability, reverse of fluid loss test, md. | 0.50 | 4.79 | 27.9 | 15.5 |
| Original permeability retained direction of fluid loss test, percent | $5.5 \times 10^{-4}$ | $3.11 \times 10^{-4}$ | $9.57 \times 10^{-4}$ | $6.43 \times 10^{-4}$ |
| Original permeability retained reverse of fluid-loss test, percent | 0.55 | 2.68 | 24.2 | 7.90 |

Next, a group of four core wafers taken from the Berea sand were subjected to a fluid loss test as before, but with 0.03 lb. per gallon of silica flour and 0.02 lb. per gallon guar gum substituted for the precious fluid loss additive. The particle size range of the silica flour used in this test was substantially the same as that of the clay minerals used in obtaining the data reflected in Table I. After the fluid loss tests were completed, the wafers were reversed and a series of aqueous solutions containing 0, 10, 100 and 1000 parts per million of the quaternary ammonium bactericide used in Example I were prepared. Each of the individual solutions was then passed through a separate core, as before, at about 20 p.s.i. to measure return permeability. The results of these tests are reflected in Table II.

The tests conducted in obtaining data shown in Table II were repeated except that 10, 100 and 1000 parts per million of the bactericide were added to the liquid used in the original fluid loss tests and the core wafers were subjected to a given bactericide concentration both in a fluid loss test and in a permeability measurement. The results of this series of experiments are reflected in Table III.

TABLE II

[Effect of quaternary ammonium bactericide on the permeability of Berea core wafers when flushed through the wafers in the reverse direction of the fluid loss tests using 0.03 lb./gal. silica flour and 0.02 lb./gal. guar gum]

| Core No. | 5 | 6 | 7 | 8 |
|---|---|---|---|---|
| Bactericide conc., p.p.m. | 0 | 10 | 100 | 1,000 |
| Spurt, ml. | 67.2 | 15.5 | 16.2 | 12.0 |
| Slope, ml. min.$^{-1/2}$ | 2.33 | 1.94 | 1.90 | 1.80 |
| Original perm., md. | 172 | 71 | 31.8 | 57 |
| Retained perm. reverse of fluid loss test, md. | 13.9 | 29.4 | 124 | 32.8 |
| Orig. perm. retained, percent | 8.1 | 41.5 | (*) | 57.6 |

*Retained perm. > orig. perm. Wafer may have fractured.

TABLE III

Effect of quaternary ammonium bactericide on the permeability of Berea core wafers when mixed in the original fluid loss solution containing 0.03 lb./gal. silica flour and 0.02 lb./gal. guar gum and when flushed through the wafer in the reverse direction after the fluid loss test]

| Core No. | 9 | 10 | 11 |
|---|---|---|---|
| Bactericide conc., p.p.m. | 10 | 100 | 1,000 |
| Spurt, ml. | 13.5 | 14.4 | 17.6 |
| Slope, ml. min.$^{-1/2}$ | 1.83 | 1.53 | 1.13 |
| Original perm., md. | 62.0 | 62.0 | 60.3 |
| Retained perm. reverse of fluid loss test, md. | 25.1 | 28.3 | 278 |
| Orig. perm. retained, percent | 40.5 | 45.7 | (*) |

*Retained perm. > orig. perm. Wafer may have fractured.

The effect of the bactericides on permeability was determined in an additional series of tests. In this latter series, the quaternary ammonium compound used in Example I was mixed in varying concentrations with fresh water containing no fluid loss additive. Each individual solution was then used in a separate core to determine the return permeabilities of the various wafers, using a pressure of about 20 p.s.i. Data from this series of tests are collected in Table IV.

TABLE IV

[Effect of quaternary ammonium bactericide on permeability of Berea core wafers]

| Core No. | 12 | 13 | 14 | 15 |
|---|---|---|---|---|
| Bactericide conc., p.p.m. | 0 | 10 | 100 | 1,000 |
| Orig. perm., md. | 87.5 | 60.4 | 206 | 76.6 |
| Ret. perm., md. | 83.5 | 65.5 | 225 | 93.0 |
| Ret. perm., percent | 95.5 | 108 | 109 | 122 |

In examining these data, a number of conclusions may be drawn. Of primary importance, is the fact that the presence of the bactericide in all cases increases the retained permeability of the core. This conclusion is valid whether the fluid loss additive is of the clay type, of the non-clay type, or even in situations where there is no fluid loss additive.

It is also true that when the non-clay type fluid loss additive is used, spurt loss decreases when the bactericide is utilized. Inasmuch as spurt loss is a measure of the amount of fluid which must pass into the formation before an adequate filter cake is built up, it follows that the use of the bactericide results in a faster build up of filter cake which in turn results in less fluid being lost to the formation.

In addition, when the fluid loss additive having no clay therein was used, and when curves were plotted to show the relationship of fluid loss expressed in milliliters versus the square root of time expressed in minutes, the slope of the linear portion of the curves decreased with increasing increments of the bactericide. Since the slope of these curves is a measure of how well the original filter cake was laid down, and since low values of slope indicate a low fluid loss after formation of the filter cake, it follows from this portion of the data, also, that the addition of the bactericide results in less fluid loss when fluid loss additives having no clay therein are used.

DISCUSSION OF DETAILS

The preferred class of materials for use as the bactericide in treating operations in accordance with this invention are organic substituted quaternary ammonium compounds of the type formula:

wherein:

X is a negative ion preferably chosen from the group consisting of halogens, sulfate, nitrate, citrate, acetate, hydroxide and adipate; of these, the halogen ions are preferred and of the halogen ions, chloride is most often chosen.

R is an alkyl having from 1 to about 20 carbon atoms.
R′ is chosen from the group consisting of:
(a) single ring aromatic radicals;
(b) alkyls having from 1 to about 20 carbon atoms, and preferably from about 6 to about 18 carbon atoms; and
(c) alkyl substituted single ring aromatic radicals, wherein the alkyl has from 1 to about 20 carbon atoms, and preferably alkyl substituted benzyl radicals wherein the alkyl has from about 6 to about 18 carbon atoms.

This class of materials has been found particularly useful in modifying injection fluids since, in addition to its bactericidal properties, it possesses surface active properties, i.e., the ability to reduce the surface tension of water by at least about 25% when added to water in the prescribed amounts. As a group, the C6 to C18 hydrocarbon substituted polymethyl ammonium halides are preferred and dodecylbenzyl trimethyl ammonium chloride is particularly useful. For ease of handling in field work and in order to prevent freezing of liquid components under inclement conditions, 50% alcohol solutions of the quaternary ammonium compounds have been found to be useful.

Examples of compounds within this class are as follows:

*Quaternary ammonium compounds*

Soya trimethyl ammonium chloride
Tallow trimethyl ammonium chloride
Octadecyl trimethyl ammonium bromide
Hexadecyl trimethyl ammonium hydroxide
Dicoco trimethyl ammonium chloride
Ditallow trimethyl ammonium chloride
Methyldodecylbenzyl trimethyl ammonium chloride
Diisobutylphenoxy ethoxy dimethyl benzyl ammonium chloride monohydrate
Tridecyl benzyl hydroxyethyl imidozolinium chloride
Trimethyl octadecenyl ammonium chloride Trimethyl octadeadienyl hydroquinolinium chloride
Dicyclohexyl dimethyl ethyl ammonium chloride
Dibenzyl octadecyl hexyl ammonium chloride
Tritallow dimethyl ammonium chloride
Kerylphenyl trimethyl ammonium chloride
Hexachlorophenylphenoxymethyl trimethyl ammonium chloride
Dodecyldimethyl diethyl ammonium chloride
Octadecyl methyl pyridinium chloride
Lauryl trimethyl ammonium chloride
Palmityl trimethyl ammonium chloride
Stearyl trimethyl ammonium chloride
Coco trimethyl ammonium chloride
Di (hydrogenated tallow) dimethyl ammonium chloride
Tricaprylyl methyl ammonium chloride A wide variety of other materials are employed as the bactericidal agents in accordance with this invention. Examples of such materials are indicated in the following groups:

Silicofluorides

Methylamine silicofluoride
Dibutylamine silicofluoride
Morpholine silicofluoride
Aniline silicofluoride
Bis (2-ethylhexyl) amine silicofluoride
Hexachlorophenylamine silicofluoride
Butoxyphenyl phenylamine silicofluoride

Mercuric salts

Mercuric tertiary butyl mercaptide
Mercuric ethyl mercaptide
Mercuric methyl mercaptide
Mercuric ethyl 2-pyridyl mercaptide
Mercuric chloride complex of diethylester of pyridine 2,5-dicarboxylic acid
2-methyl,5-ethyl,3-pyridyl mercuric acetate
Phenyl mercuric acetate

Amines and amine salts (includes primary, secondary and tertiary amines)

Tallow amine
Soya amine
Cocoamine
Tallow amine acetate
Soya amine acetate
Cocoamine hydrochloride
Dodecyl methyl amine
Octadecyl amine
Octadecyl amine nitrate
Soya amine phosphate
N-dodecyl ethylene diamine
N-octadecyl propylene diamine
N-octyl cyclohexyl diethylene triamine
Tallow amine diphenolate
Dichlorophenoxymethyl hydroxyethyl amine
N-polyethoxyethyl ethylene diamine
Dioctyl amine nitrate
N-octadecyl ethylene diamine dinitrate
N-dodecyl propylene diamine diphosphate
Octadecyl amine perfluorocaprylate
Octadecyl amine fluoroacetate
N-hexachlorophenyl, N'-octadecyl propylene amine diperfluoroacetate
N-tallow pyridine
N-dodecyl pyrimidine hydrochloride
Proflavine hydrochloride
Acriflavine neutral
Acriflavine hydrochloride
N-octadeadienyl ethylene diamine
Ethylenediamine tetraacetic acid
Tetrasodium methylenediamine tetraacetic dihydrate
Primary lauryl amine
Primary palmityl amine
Primary stearyl amine
Primary oleyl amine
Primary coconut oil amine
Primary hydrogenated tallow amine
Primary cottonseed oil amine
Secondary coconut oil amine
Secondary hydrogenated tallow amine
Tricaprylyl amine
N-coco-1,3-propylene diamine
N-tallow-1,3-propylene diamine

Halogenated aryl compounds

Potassium 2,4,6-trichlorophenate
2,4,5-trichlorophenol
Sodium tetrachlorophenate
Sodium pentachlorophenylphenate
2,4,6-trichlorophenol
4,6-chloro-2-phenyl phenol
3-hexachlorophenoxyphenyl-1-hydroxphenyl propane
2,4-difluoro-6-nitrophenol
2,nitro-4-fluophenol
2,4-dinitro-5-chloro fluorobenzene
Chlorinated tris-phenol
Chlorinated bis-phenol
Dihydroxy dichlorodiphenyl methane

Miscellaneous materials

Sodium hyperchlorite
Formaldehyde
Methylene blue
Methylene blue double zinc salt
Chrysoidine-Y
Picric acid
Phenosafranin
Gentian violet
Acriviolet
Terramycin
Aureomycin
Thiolutin
Chloromycetin
Perfluorocaproic acid
Trifluoroacetic acid
Perfluorobutyric acid
Perfluorocaprylic acid It will be understood that all of the different types of bactericidal agents listed above are not equally effective although all of those listed produce appreciable improvement when used in accordance with this invention. The chlorinated phenol compounds are not practical for use in accordance with the invention if the fluid which is produced from the treated well is to be used in catalytic refining since the presence of the chlorinated phenols may poison platinum catalysts used in such refining operations. Also, the organic sulfur type bactericides listed above are generally not recommended for use where substantial amounts of salt will be encountered in the subterranean formation since these compounds have a tendency to precipitate in brines.

The preferred water-soluble quaternary ammonium compounds as referred to above are preferably used in a concentration of about 300 to about 5000 p.p.m. in the injected fluids.

As indicated by the examples given above, the quaternary ammonium bactericides or other agents toxic to sulfate reducing bacteria may be soluble in the carrier liquid of the hydraulic fracturing composition and added directly thereto to form a solution in the carrier liquid. As a modification, however, a bactericide chosen from any of the classes of materials indicated above which is less soluble in the carrier liquid is employed. In such case, solid or semi-solid materials, e.g., picric acid, most of the anti-biotics listed such as terramycin and many of the amine salts are employed, particularly when hydrocarbons are used as the carrier liquid. Advantageously, solid bactericides are utilized as particle suspensions in the carrier fluid. As a preferred modification, bactericides and preferably bactericides soluble to less extent than about 500 parts by weight per million parts of carrier liquid are employed by impregnating such bactericide into porous, preferably permeable, solid material or coating the bactericide on solid material which is substantially insoluble and inert to the carrier and connate liquids. The use of bactericide with such solid particles involves the use of, for example, 1 to 50 parts of the bactericide for each 100 parts of the inert solid particles which preferably have a particle size within the same ranges given above for propping agents. Within the preferred size range such bactericide impregnated particles serve to supplant or supplement the propping agent used in the fracturing fluid and provide extended, controlled release of the bactericide into fluids produced from the well. It is understood, of course, that the relatively insoluble bactericides utilized with this embodiment must evince sufficient solubility in the fluid produced from the well to insure a bactericidal or bacteristatic environment therein at all times.

Among the mechanical steps and conditions employed in the new fracturing operations are generally those now known to be useful either for squeeze or fracture treatment. For example, treating pressures for fracture are preferably 1000 p.s.i. or higher differential pressure. Differential pressure is the difference between the formation face pressure and the combination of pump pressures at the surface and hydrostatic pressure. Pump rates for injection of the fracturing fluid should be about 10 barrels per minute (b.p.m.) or higher, generally up to 50 b.p.m. Any volume of the fluid which is utilized will be found advantageous, however in general, at least about one volume of injection fluid corresponding to the volume of the well bore within the portion of the formation to be treated will be used. In the case of fracture treatment, the volume of injected fluid which is used is equal to the volume of fluid used for fracturing, which value is determined by a variety of factors including lithology, extent of fracture desired, fluid loss characteristics of the formation, and the like. As is obvious, fracturing is a well known art, and the volume of fluid used in any given fracture can be easily determined by those skilled in the art using standard procedures. In any event, it is desirable to use at least about 5 pounds of bactericide per treatment. Additives which may be included in the fluid along with the bactericide are well known and include gelling agents, fluid loss agents, propping agents, de-emulsifiers, corrosion inhibitors, surfactants, emulsifiers, acid, and foaming agents.

When the bactericides taught herein are utilized in formation squeeze operations, the fluid will ordinarily comprise, in addition, water or brine as a carrier liquid and possibly a fluid loss agent. Pump rates and pressures are low enough to prevent fracturing, typically less than 10 b.p.m. at less than 100 p.s.i.

The use of the invention has been described primarily with respect to sulfate reducing bacteria, such as are found in the genus, Desulfavibrio, typically *Desulfavibrio desulfuricans,* but the invention is contemplated for use against other micro-organisms, such as, for example, may produce slimes or undesirable ion compounds.

Sand is a preferred material for use as propping agents in forming fracturing compositions since it is readily available in most well areas and can be obtained in the necessary sizes. Any other readily available and inexpensive solid which is substantially insoluble in water and hydrocarbons may be used, e.g., ground cinder, furnace slag, mica, feldspar, ground glass, aluminum pellets, nutshell particles and the like.

The invention as described in detail above provides new improvements in the treatment of subterranean formations, particularly oil and gas bearing formations. The new procedures are characterized by a substantial reduction in corrosion of rods, tubing, casing and other metal elements associated with the well which come into contact with fluids produced from the well following the fracturing operations. Further, such procedures reduce or eliminate souring of the well and reduce the amount of scaling and plugging which would be normally expected, particularly with a water-fracture, of wells existing in an area in which the oil or other fluid carrying subterranean formation contains a substantial amount of water-soluble sulfate. Since the protection afforded by the new procedures is not of brief duration, but extends over a substantial period and, further, since only small amounts of the bactericides have been found necessary to provide such extended protection, the new procedures are commercially feasible in the treatment and operation of oil wells. Actually, the cost of the new procedures, above and beyond the cost of a normal water fracture, is small enough to permit the new procedures to be employed as insurance against corrosion and souring problems since the small added cost of the new methods is much smaller than the cost of remedial treatment which would be made necessary by the occurrence of increased corrosion, souring, plugging or scaling.

It is obvious that many variations may be made in the products and processes of this invention without departing from the spirit and scope thereof.

I claim:

1. A method for treating a subterranean formation to reduce sulfate formation which comprises fracturing said formation with a mixture consisting essentially of a carrier fluid, a propping agent, a bactericide effective against sulfate reducing bacteria, said bactericide being present in at least 100 parts per million parts of injection mixture and producing fluid from said subterranean formation including substantially all of said mixture.

2. The method of claim 1 wherein the bactericide comprises from about 100 to 100,000 parts per million parts of carrier fluid.

3. The method of claim 2 wherein the bactericide comprises from about 200 to about 5000 parts per million parts of carrier fluid.

4. The method of claim 2 wherein the bactericide is a $C_6$ to $C_{18}$ hydrocarbon substituted polymethyl ammonium halide.

5. The method of claim 4 wherein the polymethyl ammonium halide is dodecylbenzyl trimethyl ammonium halide.

6. A method of producing oil from an oil-bearing subterranean formation containing mineral sulfates and penetrated by a well bore to reduce sulfate reducing bacteria and to reduce pronounced corrosion to metal elements that contact fluids which issue from the formation and without substantial plugging of fluid conduits that convey said fluids, said method comprising:
   (A) Providing a fracturing fluid comprising a carrier liquid,
   (B) adding to said fracturing fluid between about 100 to 100,000 p.p.m. of a soluble bactericide effective against sulfate producing bacteria,
   (C) pumping the resulting fracturing fluid into the well bore,
   (D) forcing said resulting fracturing fluid into said formation with sufficient pressure to fracture said formation thereby creating flow channels in said formation communicating with said bore hole,
   (E) removing substantially all of the fluid containing said bactericide, and
   (F) producing oil from said subterranean formation.

7. The method of claim 6 wherein said carrier liquid is water and wherein said bactericide is a water-soluble quaternary ammonium compound that is toxic to sulfate producing bacteria and said bactericide is present in an amount from about 100 to about 5,000 p.p.m. of the water.

8. An injection fluid for fracturing a subterranean formation to reduce sulfate production, said fluid consisting essentially of:
   (A) a carrier liquid,
   (B) a propping agent suspended in said liquid, and (C) a bactericide, at least 100 p.p.m. based on total fluid, soluble in said carrier liquid and effective against sulfate producing bacteria, said composition being characterized by its ability to inhibit pronounced corrosion of metal elements in the subterranean fluid system and to inhibit substantial plugging of fluid conduits within said system.

9. The injection fluid of claim 8 wherein the bactericide is present in the range of 100 to 10,000 p.p.m. and is a hydrocarbon substituted quaternary ammonium halide containing a 6 to 18 carbon atom alkyl group.

10. A well fracturing composition for use in fracturing a subterranean formation to create flow channels in said formation and reduce sulfate formation, said fluid consisting essentially of:
(A) water,
(B) sand, and
(C) a water-soluble quaternary ammonium halide containing a 6 to 18 carbon atom radical and toxic to sulfate producing bacteria,
the proportion of sand to water being between about 1:100 and 5:1 and the proportion of said quaternary ammonium halide being between 200 and 5,000 parts per million parts of water.

11. The composition of claim 10 wherein said quaternary ammonium halide is dodecylbenzyl trimethyl ammonium halide.

12. The composition of claim 10 wherein said halide is chlorine.

References Cited by the Examiner
UNITED STATES PATENTS

| | | | |
|---|---|---|---|
| 2,645,291 | 7/53 | Voorhees | 166—42 |
| 2,692,231 | 10/54 | Stayner | 166—1 |
| 2,879,847 | 3/59 | Irwin | 166—42 |
| 2,912,378 | 11/59 | Bernard | 210—52 |
| 2,975,834 | 3/61 | West | 166—42 |
| 3,022,248 | 2/62 | Anderson et al. | 166—42.1 X |
| 3,033,784 | 5/62 | Jones | 166—9 |
| 3,046,222 | 7/62 | Phansalkar et al. | 166—42.1 X |
| 3,058,909 | 10/62 | Kern | 166—42 |
| 3,072,192 | 1/63 | Van Pollen | 166—42 |
| 3,119,447 | 1/64 | Raifsnider et al. | 166—1 |

OTHER REFERENCES

McCutcheon: "Surfactants Listed," fourth revison of Synthetic Detergents and Emulsifiers, 1958, MacNair-Dorland Co., Inc., N.Y., page 11 relied upon.

CHARLES E. O'CONNELL, *Primary Examiner.*

BENJAMIN HERSH, *Examiner.*

UNITED STATES PATENT OFFICE
CERTIFICATE OF CORRECTION

Patent No. 3,199,591                                August 10, 1965

James A. Kepley

It is hereby certified that error appears in the above numbered patent requiring correction and that the said Letters Patent should read as corrected below.

Column 16, lines 26 and 72, and column 17, line 14, for "sulfate", each occurrence, read -- sulfide --; column 16, lines 55 and 68, and column 17, line 3, for "producing", each occurrence, read -- reducing --.

Signed and sealed this 19th day of April 1966.

(SEAL)
Attest:

ERNEST W. SWIDER                              EDWARD J. BRENNER
Attesting Officer                                    Commissioner of Patents